United States Patent [19]

Lamb

[11] Patent Number: 4,691,466
[45] Date of Patent: Sep. 8, 1987

[54] CURRENT KILLER, SWIFT WATER FLOATER

[76] Inventor: Timothy K. Lamb, Rte. 1, Box 294, Red House, W. Va. 25168

[21] Appl. No.: 854,923

[22] Filed: Apr. 23, 1986

[51] Int. Cl.⁴ .............................................. A01K 93/00
[52] U.S. Cl. .................................................. 43/43.13
[58] Field of Search .................. 43/43.13, 42.22, 26.1

[56] References Cited

U.S. PATENT DOCUMENTS

| | | | |
|---|---|---|---|
| 2,235,236 | 3/1941 | Ramseier | 43/43.13 |
| 2,545,185 | 3/1951 | Winslow | 43/43.13 |
| 2,862,326 | 12/1958 | Minera | 43/43.13 |
| 2,912,782 | 11/1959 | Maximov | 43/43.13 |
| 3,044,208 | 7/1962 | Minera | 43/43.13 |
| 3,949,512 | 4/1976 | Stegemeyer | 43/43.13 |
| 4,028,840 | 6/1977 | Wille | 43/43.13 |
| 4,524,538 | 6/1985 | Halvorsen | 43/43.13 |

*Primary Examiner*—Gene P. Crosby

[57] ABSTRACT

A swift water fishing device rectangular in shape with one side weighted for vertical bouyancy, a forward sloping three angled bow with a releasable three point hitch yoke system capable of vertical and horizontal adjustment.

3 Claims, 3 Drawing Figures

U.S. Patent   Sep. 8, 1987   4,691,466
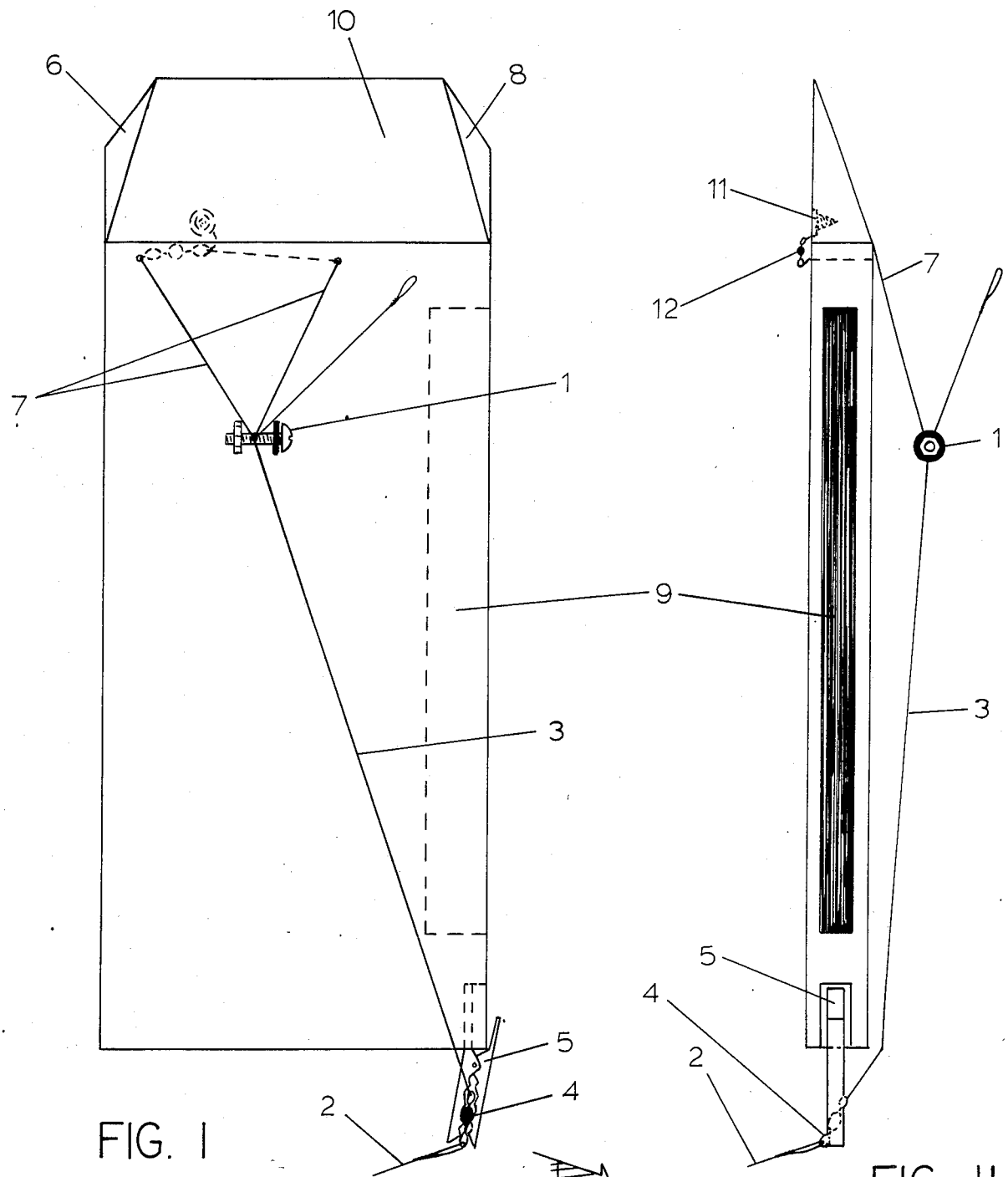
FIG. I
FIG. II
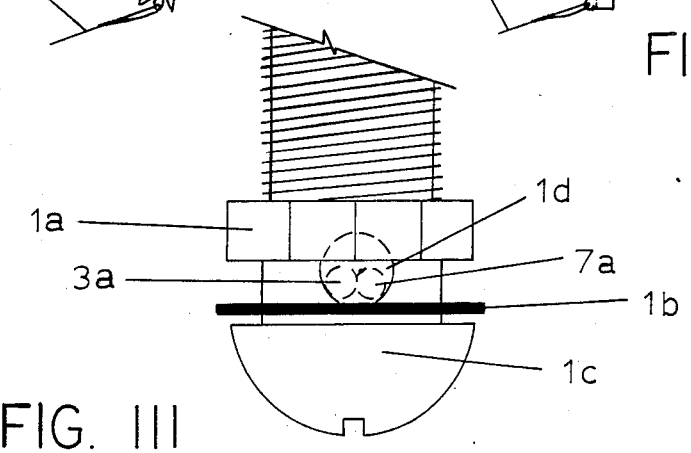
FIG. III

CURRENT KILLER, SWIFT WATER FLOATER

FIELD OF INVENTION

This invention relates to swift water fishing tackle utilizing a floater and a shore controlled line.

The primary object of this invention is fishing in areas unaccessable by boat or waders such as locks and dam tailwaters.

DESCRIPTION OF THE PRIOR ART

The swift water floater was derived from a trolling device called a surface side planner, although effective for trolling the perpendicular angle protruding from the shoreline is not efficient for bank fishing. The swift water floater can be positioned from minus one degree perpendicular to parallel from one spot on the bank due to the simplified harness and tripable release system. When the trailing leader is struck by a fish the floater can be retrieved in an unrestricted manner.

SUMMARY OF THE INVENTION

A swift water fishing device comprising of a rectangular lightweight bouyant material having a three angled frontward sloping bow, with one side weighted as to maintain vertical buoyancy; a three point hitch adjustable yoke system with a rear mounted tripable release which serves as the anchor point of the yoke system, and when the trailing leader is struck, the floater can be retrieved in an unrestricted manner.

BRIEF DESCRIPTION OF THE DRAWINGS

In accordance with the drawings,

FIG. 1 is a side view and is illustrative of the vertical positioning, with weighted side 9 down.

FIG. 2 is a bottom view showing positioning of the weighted side and of the alligator clip release.

FIG. 3 is an expanded view of a barrel swivel for vertical and horizontal adjustment.

DESCRIPTION OF THE PREFERRED EMBODIMENTS

The main body of the swift water floater is made of balsa wood or other lightweight bouyant material, with an elongated rectangular body weighted on one side 9 FIG. 1 and FIG. 2 with a three angled forward sloping bow 6, 8 and 10 which will be referred to hereforth as upper bow pitch 6, lower bow pitch 8 and vertical bow pitch 10. The current is split by the sloping vertical bow pitch 10 FIG. 1, the hydrodynamic lift will force the floater away and up stream from the said position on the shoreline. The three point hitch yoke system FIG. 1 is made up of vertical stabilizing cables 7, the horizontal tether cable 3 and a barrel swivel 1. An expanded view is shown in FIG. 3 for vertical and horizontal adjustment. The horizontal tether cable 3 which is connected to the barrel swivel, is inserted into the alligator clip 5 which is the anchor point of the three point hitch yoke system. The alligator clip release 5 cannot be tripped until a fish strikes the trailing leader 2, FIG. 1. Once the release is tripped the floater will not hinder the retrieve of the fish. The vertical and horizontal adjustment (expanded view) FIG. 3 controls vertical stabilizing cables 7 and horizontal tether line 3, FIG. 1. The adjustment consists of a threaded screw 1c, a washer of rubber or plyable material 1b and a plastic or rubber nut 1a. A hole is drilled through said screw 1c large enough to accommodate both vertical stabilizing cables 7 and horizontal tether line 3.

To adjust the floater to said current velocity loosen rubber nut 1a and adjust vertical stabilizing cables 7 and horizontal tether line 3 simultaneously for optimum efficiency.

When the floater is adjusted the lower bow pitch 8 causes hydrodynamic lift to help prevent under current nose dive. If nose dive dose occur the upper bow pitch 6 will prevent an uncontrolled dive. With upper bow pitch 6 and lower bow pitch 8 formed to the same angled pitch, the bow becomes a balanced rudder and uniformly spirals instead of diving to the bottom. The controlled spiralling action is overcome by releasing pressure on horizontal tether line 3. Because of said bouyancy the floater will rise to surface.

In reference to 11 and 12, FIG. 2, these reference points are the two ends of vertical stabilizing cables 7 and a wood screw which acts as an anchor point to prevent slipping. But other means of anchoring vertical stabilizing cables 7 are possible as long as they are durable.

Accordingly, this invention is limited only in accordance with the appended claims.

What is claimed is:

1. A swift water fishing device for maneuvering a fishing line to a desired location, comprising, a lightweight rectangular elongated body of bouyant material having a front bow, a trailing end and two side surfaces, said bow having three angled planar surfaces forwardly sloping toward one of said side surfaces, a lower one of said planer surfaces causing hydrodynomic lift on said body when disposed substantially perpendicular to the water surface in an up stream direction; a three point hitch yoke system for angularly disposing said body substantially perpendicularly to the water surface, one point of said three point hitch yoke system being a fixed anchor point on said trailing end of said body and having a tripable release for holding a hook end of the fishing line.

2. A fishing device in accordance with claim 1, which is adjustable for swift water current velocity changes, by vertical and horizontal adjustment of the three point hitch yoke system.

3. A fishing device in accordance with claim 1 wherein said device is lightweight, castable and easily manuverable, for fishing in previously unfishable waters, and for fishing swift water conditions without repeated casting.

* * * * *